United States Patent Office 3,445,081
Patented May 20, 1969

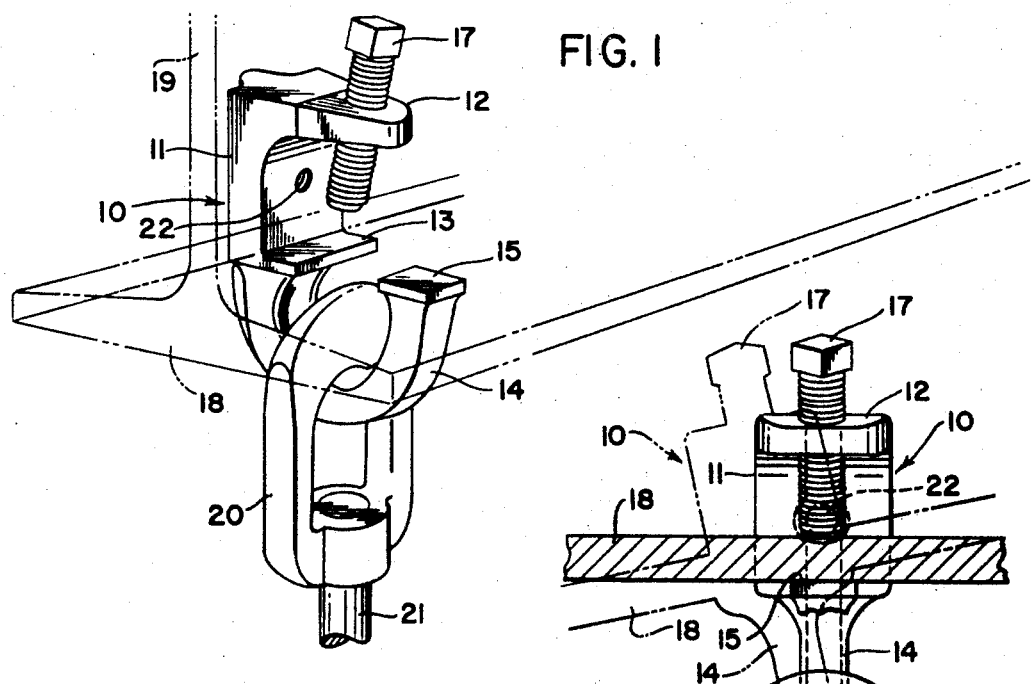
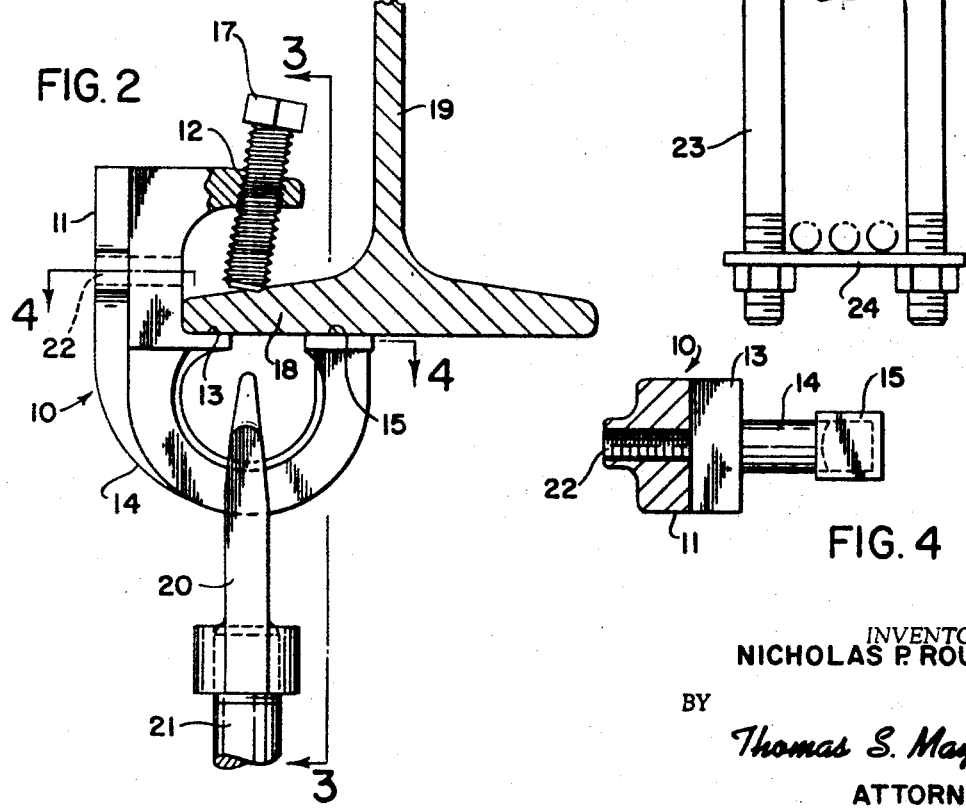

3,445,081
CONDUIT CLAMP SUPPORT
Nicholas P. Roussos, Bridgeville, Pa., assignor to Midland-Ross Corporation, Cleveland, Ohio, a corporation of Ohio
Filed Jan. 17, 1967, Ser. No. 609,936
Int. Cl. F16l 3/00
U.S. Cl. 248—72                                    1 Claim

ABSTRACT OF THE DISCLOSURE

A C-type clamp formed of two C-type sections, one in a veritcal direction and the other as a base in the horizontal direction, the two being joined through a common end. The common juncture or end and one other end have spaced pads which, when drawn up against a structure such as an I-beam, channel, or angle iron, provide a hanger support. The lower C-section has an inner arcuate portion between the pads used to support a loosely depending U-shaped hanger or threaded ring adapted to freely support a hanger for pipe, conduit, tubing, cables, etc.

---

This invention relates to support clamps that are securable to overhead structural members and which themselves provide a support for swingable suspension means for hangers supporting pipe, conduit, tubing, cable, etc. More particulraly, the invention relates to a universal type clamp adapted to be used with structural members positioned in supporting levels other than horizontal.

In the construction industry structural supports are not alawys level and support hangers depending therefrom are generally secured in a firm or fixed position and must be manually angled to compensate for the level offset. The utilization of such a rigid supporting means for conduit, tubing, etc. is costly in time and additional tools used in the bending of suspending support hangers to a level position. The clamp support means of this invention advantageously provides for a fixed rigid support including a base depending arcuate portion in which is placed a U-shaped hanger means or a closed clevis or yoke that has been threaded. Such a pendant device is then positioned through its weight or by the weight that it bears, generally in a vertically downward direction irrespective of the position of the beam to which it is clamped. As briefly described the clamp comprises two C-type sections having a common end or leg. An end or top portion of the vertically positioned C is threaded to accept a set screw, and there are horizontal pads on the middle and the other outer leg. A drawing up of a screw positioned in the threaded portion of the upper end of the vertical C firmly pulls up the two pads of the common end and the terminal end of the lower C-section against the flange on which it is mounted giving positive and firm support. In the arcute portion therein is positioned a freely movable pendant threaded ring or yoke hanger or whatever other type of suspended means that it is desired to use.

The herein described support also provides for a conduit mounting that will allow for movement induced by changes in temperature, for expansion and contraction. An example, besides daily and seasonal temperature changes, are uses with refrigeration and steam lines. In addition, in areas subject to earthquakes all conduit and piping supports are required that allow for at least at 15° movement in all directions in order that hangers and supports will not be broken should a structure be suddenly and unexpectedly moved.

The clamp support and its advantages will now be specifially described in the following specification taken in connection with the accompanying drawings, where:

FIGURE 1 is a perspective view of the clamping means in a mounted position on a flange of a structural section;

FIGURE 2 is a sectional view of the clamp in a mounted position on the flange of a structural section;

FIGURE 3 is an elevational sectional view in both a horizontal and an angular position as mounted to a flanged of a structural member, the view being taken across line 3—3 of FIGURE 2 showing a modified hanger; and FIGURE 4 is a further sectional plan view taken across line 4—4 of FIGURE 2.

With reference to FIGURES 1 and 2 of the drawing the clamp 10 is formed of two C-type sections 11 (the vertical) and 14 (the horizontal) with a common end or leg forming a base pad 13. The corresponding end, or the terminal end of the low C has a pad 15, and both pads 13, 15 are on the same level. The top or vertically positioned C has its terminal end 12 threaded to accept the setting screw 17. The base section has a bow in it to accept a hanger element 20. Thus the clamp 10 is advantageoùsly adapted to be mounted on flanges of structural members such as I-beams 19, angles, H-sections, channels, etc. by being slid over a flange thereof and secured thereto. The spaced pads 13, 15 of the clamp 10 can be drawn up securely by the threaded screw 17 boring into the upper surface of the flange 18.

The upper C-portion of the clamp 10 can have a generally vertical intermediate section 11 with a threaded hole for miscellaneous use while it is preferred that the base have an accentuated arcuate section 14 to accept a freely moving hanger element 20. As stated, the base section 14 is advantageously arcuate since that portion is designed to support a freely swingable hanger 20 and its threaded member 21.

Hangers can be like the ring-like member 20 shown depending from the arcuate section 14. Such hangers are threaded to receive therethrough a further threaded member 21 (not completely shown) having a form that is adapted for the support of pipe, conduit, cable, etc. Or, the hanger can be the element 23 of FIGURE 3 having an inverted U-form that can be slipped through the arcuate portion. The legs of the hanger 23 are threaded and they are adapted to receive a cross member 24 retained thereon by suitable means as nuts. Conduit, cable, etc. is supported by the cross bar 24. Where a closed ring 20 is to be suspended from the arcuate section 14 it would have to be placed therein prior to the securing of the clamp 10 onto the beam 18, the other type in the form of the letter U can be slipped through at any time.

An advantage of the clamp 10 is further demonstrated in FIGURE 3 where a vertical positioning of the suspending holders or hanger 23 is had irrespective of angularity of the clamp 10 secured to a tilted flange 18. Any hanger freely movable in the arcuate section 14 of the clamp 10 will assume a vertical position because of gravity.

Substantial bearing area against slippage and rotation is provided by the enlarged common pad 13 along with the smaller outer pad 15, as shown in FIGURES 1 and 4. The width of the common pad 13 is advantageously greater than that of the outer pad 15 to provide for an enlarged positive stability against rotation either vertically or horizontally and for more holding area of the flange surface.

What is claimed is:

1. A freely swingably adjustable support for pipe, tubing, conduit and the like securable to a rigid flanged structural form comprising, a first generally C-shaped element having one end threaded and a secured threaded screw positioned therein, a generally C-shaped second element joined to the first through a common end at about a 90° angle thereto and both C-shaped elements facing the interior, said common end and the free end of said second C-shaped element having flat pads in the same plane, both pads adapted to be drawn up against the flanged surface of said structural form by said threaded screw, said second C-shaped element having an open arcuate intermediate section between its pads for receiving a hanger therethrough, and a hanger element for the support of pipe, etc. adapted to being freely positioned in said arcuate section, suspended therein.

References Cited

UNITED STATES PATENTS

| | | | |
|---|---|---|---|
| 956,705 | 5/1910 | Hofacker | 108—97 |
| 2,163,635 | 6/1939 | Shea | 248—72 |
| 2,749,068 | 6/1956 | Wayman | 248—72 |
| 3,185,418 | 5/1965 | Appleton | 248—72 |

CHANCELLOR E. HARRIS, *Primary Examiner.*

R. P. SEITTER, *Assistant Examiner.*

U.S. Cl. X.R.

248—228, 340